United States Patent Office 3,312,752
Patented Apr. 4, 1967

3,312,752
PRODUCTION OF LOW MOLECULAR WEIGHT
LIQUID POLYMERS OF 1,3-DIOLEFINS
Bernhard Schleimer, Marl, Germany, assignor to Chemische Werke Huls A.G., Marl, Germany
No Drawing. Filed July 8, 1965, Ser. No. 470,587
Claims priority, application Germany, July 9, 1964,
C 33,362
16 Claims. (Cl. 260—680)

This invention relates generally to a method of producing low molecular weight liquid unsaturated polymers, and in a more narrow sense, to a method of polymerizing conjugated dienes with or without alpha-olefins. In one aspect, the invention relates to a method of regulating and controlling the aforesaid polymerization process; and in another aspect, the invention is directed to the use of a method of polymerization to produce a liquid unsaturated polymer having a low molecular weight.

The liquid unsaturated polyolefins and polydienes having a low molecular weight and produced by the process of this invention are useful in various applications. For example, particular utility has been found for these polymers as plasticizers for rubber, in the production of films, coatings, molding compounds, and the like, which are hardenable by cross-linking. These low molecular weight polymers are also useful as self-hardening oils, and hence they may conveniently be used as additives to other drying oils. Also, the polymers produced by the process of this invention are useful as intermediate compounds inasmuch as their double bonds can be readily epoxidized, halogenated, hydrohalogenated, and hydrogenated, and otherwise treated to yield new and useful derivatives.

Various methods are described in the literature for polymerizing conjugated diolefins and alpha-olefins, including the use of a Ziegler-type catalyst comprising an organometallic compound and a metal salt of Group VIII of the Periodic Table in the presence of at least 0.2 part by weight of vinyl-cycloolefin per part of the unsaturated hydrocarbon being polymerized. As an example, in German Patent No. 1,144,008, there is described a method of producing high molecular weight polydiolefins wherein the polymerization reaction is supposedly regulated with at least 0.2 part by weight of a vinyl-cycloolefin per part of the reacting diolefin monomer. In processes of the aforesaid type, the vinyl-cycloolefin used in producing high molecular weight polymers conventionally functions as a diluent for the reactants, since it is known that lower molecular weight polymers are usually obtained when mixtures of diluents, such as aromatics, e.g. benzene, aliphatic, or cycloaliphatic hydrocarbons are used instead of a pure diluent. The use of such diluents to regulate the molecular weight of the polymers provides little or no measure of control, and, in fact, it is usually necessary to employ an agent which regulates the polymerization process itself.

In the usual procedures of regulating the polymerization of diolefins when Ziegler catalysts are used therewith, the conventional polymerization regulating agents, such as butadiene-(1,2), allene, acetylene, acrylonitrile, acetonitrile, and allyl chloride are generally unsatisfactory; this is especially so when it is desired to produce a polymer having an average lower molecular weight. The principal reason for the dissatisfaction with these conventional regulators is that exceedingly low yields of the desired polymer are obtained, namely of the low molecular weight polymer having a low viscosity. Hence, in order to produce high yields of the low molecular weight, low viscosity liquid polydienes, additional polymerization controls must be resorted to.

When it is desirable to produce polydienes, such as cis-1,4-polybutadienes having molecular weights of between 1,000 and 10,000 and viscosities between 80 and 350 centipoises (measured at 50° C.), butadiene is polymerized with a mixed catalyst system comprising organic nickel and aluminum compounds in the presence of inert diluents. In this reaction, the mixed catalyst consists of diluent-soluble compounds of nickel, and alkyl-aluminum halides of the general formula $$R_nAlX_{3-n}$$

wherein R is an alkyl or alkyl-aryl group, X a halide, and $n$ is 1.5. To produce this same polymer with a lower average molecular weight and lower viscosity, rigorous control of the polymerization reaction is necessary. Thus, to produce a liquid cis-1,4-polybutadiene with a viscosity of about 100 centipoises (measured at 50° C.) and a molecular weight of from 1,000 to 3,000, it is necessary to maintain the polymerization reaction at a temperature of about 0° C. in a benzene-pentane solvent mixture in the ratio of 3:1 by volume, respectively. The ratio of the aluminum to nickel in the mixed catalyst is between 4 to 6:1, and the water content of the reaction mixture must ordinarily be maintained at about 10 p.p.m., that is, the reaction is conducted under nearly anhydrous conditions.

It is, therefore, an object of this invention to provide an improved method which facilitates the polymerization of conjugated diolefins with or without alpha-olefins into low molecular weight, liquid unsaturated polymers.

Another object of the invention is to provide a novel catalyst system for use in the polymerization of conjugated diolefins and alpha-olefins.

Other and further objects and advantages of the invention will become apparent to one skilled in the art upon consideration of the process as hereinafter described.

To attain these objects, the present invention comprises a process for the production of low molecular weight, liquid unsaturated polymers which are formed from conjugated diolefins with or without alpha-olefins in the presence of diluents, an organometallic mixed catalyst system, and a polymerization regulator therefor.

In particular, it has been discovered that, when vinyl-cycloolefins are used in the polymerization of conjugated diolefins in an amount smaller than that employed heretofore, some olefins now unexpectedly perform as polymerization regulators instead of functioning in their usual role, as diluents. More specifically, liquid unsaturated polymers having molecular weights between about 500 and 5,000 (the molecular weight being determined in a steam pressure osmometer) and viscosities, measured at 50° C., of between 50 and 500 centipoises can be produced from conjugated diolefins more simply and with a minimum of controls when employing the process of the present invention.

Briefly stated, the simplified polymerization process of the present invention is performed with conjugated dienes in the presence of inert diluents, a diluent-soluble mixed catalyst comprising catalytic quantities of nickel compounds and aluminum halides of the formula $$R_nAlX_{3-n}$$

wherein R is an alkyl, phenyl or alkyl-aryl group, X is a halogen, and $n$ is a number between 1 and 2, and 0.005–0.15 part by weight of a vinyl-cycloolefin having preferably 6–18 carbon atoms, per part of conjugated olefin monomer undergoing polymerization.

The aluminum halide catalyst in the aforementioned general formula may comprise one or more of these aluminum compounds. For example, it is within the scope of this invention to use mixtures of trialkyl-, triaryl- or trialkyl-aryl-aluminum compounds and dialkyl-, diaryl- or dialkyl-aryl-aluminum monohalides, alkyl-, alkyl-aryl- and aryl-aluminum dihalides or aluminum trihalides provided that the average number of both halogen atoms per aluminum atom and the number of alkyl-, aryl- or alkyl-aryl groups is between 1 and 2. In general, R is beneficially a hydrocarbon radical containing up to 12 carbon atoms, though a higher number of carbon atoms can be used.

The preferred aluminum halide comprises either alkyl-aluminum-sesquihalides, monoalkyl-aluminum-dihalides, or dialkyl-aluminum-monohalides in which the alkyl preferably contains up to 12 carbon atoms, and more preferably is selected from the group comprising methyl, ethyl, propyl, n-butyl, isobutyl, n-octyl, 2-alkyl-hexyl, or dodecyl; and the halogen is chlorine, bromine or iodine. It is also within the purview of this invention to employ aluminum hydrides, preferably in the form of either lithium aluminum hydride or sodium aluminum hydride in admixture with the above-named alkyl-aluminum halides. In some instances, it has also been found desirable to use aluminum-hydride halogenides and etherates thereof, namely, aluminum-hydride-chloride-etherate, either alone, or mixed with the above-named aluminum compounds.

The mixed catalysts suitable for the present process also contain nickel compounds which are soluble in the inert diluents which are used herein. It has been found that from 0.01 to 0.5 mole of the nickel compound should be used per mole of the aluminum-halide catalyst, and the latter is used in amounts ranging from about 0.0005 to 0.5 mole per mole of the starting monomer to be polymerized. More particularly, it has been found preferable, in commercial operations, to employ from 0.025 to 0.3 mole of the nickel compound per mole of aluminum compound, and the last-named compound preferably is used in amounts from about 0.005 to 0.05 mole per mole of the starting monomer.

It is also essential that the nickel compounds to be used in the present process are soluble in the inert diluents for the catalyst system. Thus, inorganic salts of nickel are suitable only if they are dissolved in the inert diluents with the aid of solubilizing intermediaries, such as primary, secondary or tertiary aliphatic and aromatic saturated and unsaturated alcohols, such as butyl, benzyl, allyl, and furfuryl alcohol; primary, secondary and tertiary amines, e.g. butylamine, aniline, benzylamine or pyridine; and ethers such as dialkyl ethers and diphenyl ethers, anisole, dioxane, tetrahydrofuran and furan. Preferred examples of inorganic nickel salts are nickel chloride, nickel bromide, nickel sulfate and nickel nitrate.

Organic nickel compounds particularly suitable in the present invention are nickel salts of organic carboxylic acids, preferably containing up to 20 carbon atoms, such as nickel acetate, butyrate, octoate, stearate, oleate and naphthenate, as well as complex nickel compounds such as nickel(II)-acetyl-acetonate, -benzoyl-acetonate, bis-(cyclopentadienyl) - nickel and bis - (cyclooctadienyl-(1,5))-nickel.

With the mixed catalyst system described hereinbefore is used an inert diluent that is capable of dissolving the catalytic nickel materials with, if necessary, a solubilizing intermediary (e.g. a mutual solvent). Inert diluents possessing this essential characteristic and embraced by the present invention include a variety of compounds; particularly preferred are aliphatic, cycloaliphatic and aromatic hydrocarbons having 4–12 carbon atoms, e.g. butane, pentane, hexane, cyclohexane, isopropyl-cyclohexane, gasoline fractions, benzene, toluene and mixtures thereof. Also, chlorinated hydrocarbons such as tetrachloroethylene and chlorobenzene are suitable. These inert diluents are generally used in amounts of from 0.1 to 20 parts by weight per part of reacting monomer and preferably from 0.5 to 5 parts by weight of diluent per part of monomer. However, in the usual commercial operation it has been found sufficient to use an amount of diluent of about equal to twice the amount by weight of the reacting monomer.

The catalyst system of this invention is unique in several respects, particularly with respect to the unexpected results obtained. Firstly, when a conjugated diolefin monomer is contacted, under polymerization conditions, with a vinyl-cycloolefin which is present in an amount of more than 0.15 part by weight per part of charged monomer, the conversion and ultimate yield of the high molecular polydiolefin product is extremely low. As an example, when 0.23 part of vinyl-cycloolefin is used in the polymerization of 1 part of butadiene, the over-all yield of the polydiolefins produced is only 32.4%. Hence, it would appear, on the basis of the foregoing, that vinyl-cycloolefins would be commercially unsatisfactory when high yields of polydiolefins are sought. Secondly, in producing a liquid 1,4-cis-polybutadiene from the polymerization of butadiene with a catalyst, such as ethyl aluminum-sesquichloride-nickel (II)-acetyl acetonate, and with the usual polymerization regulators, such as butadiene-(1,2), acrylonitrile or allene, it has been necessary to utilize very low reaction temperatures in order to obtain polymers having a low molecular weight. It was found that when a vinyl-cycloolefin is employed in amounts of from about 0.005 to about 0.15 part per part by weight of reacting monomer, the viscosity and molecular weight of the polymer product increase with increasing reaction temperature. At the same time, it was discovered, quite unexpectedly, that the use of smaller quantities of the vinyl-cycloolefin in the polymerization of conjugated diolefins requires fewer reaction controls, and a commercially useful polymerization reaction can be carried out between 0° and 100° C. However, to facilitate commercial operation and to achieve savings in operating costs, it is preferable to operate the polymerization reaction between 20 and 40° C. under pressures of from 1 to 10 atmospheres.

It is not fully understood how the polymerization process of this invention accomplishes results so strikingly different from those of the prior art. However, although it is not intended that this invention be bound by an explanation, it is believed that the use of a limited quantity of the vinyl-cycloolefin polymerization regulator either lowers the activity of the materials catalyzing the polymerization, or else this regulator becomes intimately involved in the reaction to the extent that it reacts, to a certain degree, with the monomer. This conclusion would seem to borne out by the fact that exceedingly higher yields are obtained with small quantities of the vinyl-cycloolefin whereas its presence in higher concentrations seemingly inhibits the polymerization reaction.

The polymerization regulators found suitable for use in this invention are the vinyl-cycloolefins containing from 6 to 18 carbon atoms, such as, for example, 1-vinyl - 4 - methyl-cyclohexene-(3), 1-vinyl-cyclopentene-(3), 1-vinyl-cyclobutene-(2), limonene, 3,5-diethyl-1-vinyl-cyclopentene-(2) or divinyl-cyclohexene, preferably 1-vinyl-cyclohexene-(3). In general, the nucleus contains up to 12 carbon atoms, and aside from this there may be up to 3 side chains, one of said side chains being a vinyl group.

Furthermore, it is to be understood that one or a mixture of the polymerization regulators aforementioned can be used to promote and regulate the polymerization reaction. Whereas the concentration of these regulators should be about 0.005 to about 0.15 part by weight per part of monomer, the preferred concentration is 0.005 to 0.075 part by weight per part of monomer.

Although the present process is especially suitable for the polymerization of butadiene, it has been found to be similarly suitable for other conjugated 1,3-diolefins containing preferably up to about 12 carbon atoms, such as isoprene, 2,3-dimethyl-butadiene-(1,3), pentadiene-(1,3), 2 - ethyl - butadiene-(1,3), 4-methyl-hexadiene-(1,3), 2-methyl-pentadiene-(1,3), 2-isopropyl-butadiene-(1,3) and octatriene-(1,3,7). Further, it is also within the contemplation of this invention to either copolymerize two or more of the above-described conjugated dienes or copolymerize the dienes with an alpha-olefin, preferably an alpha-ethylenically mono-unsaturated hydrocarbon of 8 to 16 carbon atoms, such as e.g. styrene, o-, m-, and p-alkyl styrene; o-, m-, and p-chlorine styrene; o-, m-, and p-bromine styrene; dialkyl styrene, dihalogenated styrenes; vinyl naphthaline.

Generally, in the operation of this invention, the monomer reactants may be introduced discontinuously, as in a batch operation, or else they may be introduced continuously into the reactor therefor. These monomers may be charged to the reactor in the gas phase at the operating temperatures, such as would be the case with butadiene, or else sprayed into the reactor in the liquid phase (styrene or isoprene). The polymer solution obtained after the polymerization is processed in the usual manner by decomposing the mixed catalyst with any of water, alcohol, ketones, or other like complexing agents. The diluent is then distilled off, such as with steam, and the catalyst residue may then be removed. The latter process is accomplished by washing the polymer with alcohol such as methanol or else with water at a temperature of about 80° C. The water wash solution may also contain inorganic acids or bases. The low molecular weight, liquid polymers are then freed from any impurities, such as traces of diluents like alcohol and water, by heating to 100° C. under vacuum in a nitrogen atmosphere. An alternative procedure of processing the polymer solution consists of precipitating the low molecular weight polymer with alcohol, e.g. methanol, and at the same time stirring out the catalyst. The specifically heavier unsaturated polymer is separated from the diluent and then freed from adhering alcohol by heating to 100° C. in a vacuum. It is advantageous, in removing adhering diluents such as water or alcohol, to use a thin film evaporator maintained under vacuum.

Utilization of the aforesaid process for the polymerization of conjugated diolefins yields a liquid polybutadiene having an average molecular weight from 500 to 5,000 and a viscosity from 50 to 500 centipoises as measured at 50° C. using a Hoepler dropping ball viscosimeter. The liquid polybutadienes produced by the present process are further characterized in that at least 95 percent of the double bonds are mid-positioned and at least 60 percent of these double bonds are of the cisconfiguration. When the process conditions are altered to produce a polybutadiene product having a very low average molecular weight and low viscosity, the content of the cisconfiguration of the polymer will accordingly be lower. Also, it has been found that the iodine number of the polymers produced by this invention is equal to at least 90 percent of the theoretical.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

Example 1

A number of runs were made in which butadiene was polymerized to a low molecular weight liquid polymer by a catalytic polymerization. These runs were carried out by the following procedure:

1,000 ml. of a benzene-pentane mixture (volume ratio 3:1) containing 10 p.p.m. of water was charged into a 2 liter reaction vessel which had previously been flushed with nitrogen in order to remove atmospheric oxygen and all traces of moisture. Thereafter, 10 millimoles nickel (II)-acetyl acetonate and 40 millimoles ethyl aluminum sesquichloride were added to the reactor. Then, 432 g. (8 moles) of a polymerizable monomer containing 99.1 molar percent butadiene and governing impurities of 0.04 molar percent ethyl acetylene and 0.04 molar percent allene, 0.17 molar percent propylene, 0.01 molar percent butane, 0.68 molar percent 1- and iso-butene, 0.01 molar percent trans-butene and 0.02 molar percent cis-butene, and maintained at 0° C. was continuously introduced as a gas to the reactor over a period of five hours with constant stirring. The stirring was continued for one hour after all of the monomer had been charged to the reactor whereupon the catalyst was decomposed by the addition of 50 ml. acetone thereto. The low molecular weight polybutadiene was then precipitated from the solution with methanol.

The oily and specifically heavier polybutadiene phase was separated and washed out three times, each time with 1 liter methanol, the specifically lighter methanol phase being decanted off each time. The liquid polybutadiene is then freed from the residual methanol in a vacuum (10 torrs [mm. Hg], 40° C.). The yield of polymer and percent conversion was then calculated.

The polymer was then tested to determine the configuration and type of bonds present together with the vinyl bond content thereof. The viscosity of the polymer was also measured at 50° C. in a Hoepler falling ball viscosimeter. The polymer was also tested to determine its iodine number, which was 457. The foregoing run, designated as run 1, was conducted in the absence of vinylcycloolefin in order to illustrate and show comparatively the usual results obtainable.

Several more runs designated as runs 2–5, inclusive, were thereafter conducted using the same reactants and catalyst systems as employed in run 1. These latter tests used 6.75 g. (0.0625 mole) of 1-vinyl-cyclohexane-(3) in the reacting monomer mixture, thereby to demonstrate and show comparatively the markedly improved results achieved when using the new polymerization process of this invention. The results of these comparative tests are presented below in Table 1.

TABLE 1

| Run | 1-vinyl-cyclohexene-(3) | | Yield, Percent | Viscosity, cp./50° C. | Iodine Number | Double Bonds in Percent | | |
|---|---|---|---|---|---|---|---|---|
| | G. | Mole | | | | Cis- | Trans- | Vinyl- |
| 1 | | | 79 | 213 | 457 | 85 | 13 | 2 |
| 2 | 6.75 | 0.0625 | 81 | 173 | 455 | 84 | 14 | 2 |
| 3 | 13.5 | 0.125 | 73 | 169 | 448 | 83 | 16 | 1 |
| 4 | 27.0 | 0.25 | 66 | 164 | 462 | 81 | 17 | 2 |
| 5 | 27.0 | 0.25 | 65 | 159 | 467 | 80 | 18 | 2 |

Example 2

Using the same portions of butadiene charge and catalyst mixtures employed above in Example 1, additional tests were performed at a reaction temperature of 20° C. using varying proportions of a 1-vinyl-cyclohexene-(3) as a polymerization regulator. These tests were conducted in order to better illustrate the effect and interplay of the polymerization regulator concentration at higher reaction temperatures. The results of these tests, together with the characteristics of the polymer product obtained therefrom are shown below in Table 2.

TABLE 2

| Run | 1-vinyl-cyclohexene-(3) | | Yield, Percent | Viscosity, cp./50° C. | Iodine Number | Double Bonds in Percent | | |
|---|---|---|---|---|---|---|---|---|
| | G. | Mole | | | | Cis- | Trans- | Vinyl- |
| 6 | | | 80 | 668 | 462 | 83 | 15 | 2 |
| 7 | 6.75 | 0.0625 | 72 | 314 | 454 | 80 | 18 | 2 |
| 8 | 13.5 | 0.125 | 72 | 218 | 455 | 79 | 19 | 2 |
| 9 | 27.0 | 0.25 | 77 | 132 | 449 | 78 | 20 | 2 |

*Example 3*

To illustrate how the viscosity of liquid polybutadiene depends on the amount of 1-vinyl-cyclohexene-(3) present when the polymerization is performed at a reaction temperature of 30° C., additional polymerization reactions were performed under conditions that were otherwise the same as in Examples 1 and 2 as above described. The butadiene that is added here, at a purity of 99.0 molar percent, contains as governing impurities 0.03 molar percent allene, 0.20 molar percent propene, 0.02 molar percent n-butane, <0.01 molar percent isobutane, 0.66 molar percent 1-/iso-butene, 0.02 molar percent trans-butene, and 0.03 molar percent cis-butene.

The results of these additional comparative tests are shown below in Table 3.

been charged to the reactor, stirring is continued for one hour thereafter. The catalyst is then decomposed with 50 ml. of acetone and the liquid polybutadiene product is precipitated with methanol. The oily and specifically heavier polybutadiene is separated and the residual catalyst therein is removed by washing the polymer three times with methanol, the wash liquid then being decanted. The liquid polybutadiene is finally freed from the adhering methanol in a thin film evaporator at 100° C. and under 50 torrs.

By the above procedures, 342 g. (79% theoretical) of polybutadiene is obtained whose mid-positioned double bonds are up to 86% cis- and up to 12% trans-configuration. The vinyl double bond content was 2%. The liquid polybutadiene product has a viscosity of 380

TABLE 3

| Run | 1-vinyl-cyclohexene-(3) | | Yield, Percent | Viscosity, cp./50° C. | Iodine Number | Double Bonds in Percent | | |
|---|---|---|---|---|---|---|---|---|
| | G. | Mole | | | | Cis- | Trans- | Vinyl- |
| 10 | | | 80.2 | 1971 | 456 | 83 | 15 | 2 |
| 11 | 6.75 | 0.0625 | 79.8 | 488 | 457 | 81 | 18 | 1 |
| 12 | 13.5 | 0.125 | 75.2 | 408 | 460 | 79 | 19 | 2 |
| 13 | 27 | 0.25 | 83.7 | 239 | 454 | 80 | 19 | 1 |
| 14 | 54 | 0.5 | 71.3 | 143 | 472 | 79 | 19 | 2 |
| 15 | 108 | 1.0 | 32.4 | 106 | 473 | 79 | 18 | 3 |
| 16 | 216 | 2.0 | 31.2 | 17 | 470 | 77 | 19 | 4 |
| 17 | 432 | 4.0 | 10.8 | | 463 | 77 | 18 | 5 |

*Example 4*

A butadiene polymerization reaction was here performed with a 1-vinyl-cyclohexene-(3) polymerization regulator under conditions similar to those employed in Example 1 except for the fact that the benzene diluent was omitted.

Under these conditions, the reaction was impeded to the extent that no conversion was effected and the yield was zero.

*Example 5*

To a reaction vessel which had been flushed with dry nitrogen to remove atmospheric oxygen and moisture was charged 1,000 ml. of a benzene-pentane mixture (volume ratio 3:1 with about 10 p.p.m. water) together with 10 millimoles of nickel (II)-octoate and 60 millimoles of diethyl aluminum monochloride at room temperature. 432 g. (8 moles) of a butadiene monomer at 0° C. and containing 99.0 molar percent butadiene and as governing impurities 0.03 molar percent allene, 0.20 molar percent propylene, 0.02 molar percent n-butane, <0.01 molar percent isobutane, 0.66 molar percent 1-/iso-butylene, 0.02 molar percent trans-butylene and 0.03 molar percent cis-butylene, was then continuously charged into the reactor over a five hour period while continuously stirring. After the entire monomer had centipoises at 50° C. in a Hoepler falling ball viscosimeter.

The iodine number was calculated to be 460.

*Example 6*

The same conditions and concentrations of materials as used in Example 5 were again used in this test except for the fact that the polymerization temperature was raised to 30° C.

From this test there resulted a yield of 330 g. (76% theoretical) of a polybutadiene product. The product here contained mid-positioned double bonds having up to 72% of the cis- and up to 27% of the trans-configuration. The vinyl double bonds were found to be 1% and the iodine number was 462. At 50° C., the viscosity was 532 centipoises when measured in a Hoepler falling ball viscosimeter.

*Example 7*

To illustrate how the viscosity of the liquid polybutadiene produced by the methods used in Examples 5 and 6 above is modified by the application of the present invention thereto, these same tests were again conducted at a reaction temperature of 30° C. with the addition of a 1-vinyl-cyclohexene-(3) polymerization regulator. The results of these tests are shown below in Table 4.

TABLE 4

| Run | 1-vinyl-cyclohexene-(3) | | Yield, Percent | Viscosity, cp./50° C. | Iodine Number | Double Bonds in Percent | | |
|---|---|---|---|---|---|---|---|---|
| | G. | Mole | | | | Cis- | Trans- | Vinyl- |
| 18 | | | 79 | 380 | 460 | 86 | 12 | 2 |
| 19 | | | 76 | 532 | 462 | 72 | 27 | 1 |
| 20 | 6.75 | 0.0625 | 78 | 467 | 467 | 74 | 25 | 1 |
| 21 | 13.5 | 0.125 | 72 | 304 | 466 | 65 | 34 | 1 |
| 22 | 27 | 0.25 | 75 | 268 | 455 | 61 | 38 | 1 |
| 23 | 54 | 0.5 | 35 | 105 | 460 | 73 | 25 | 1 |

In Example 18, the reaction temperature was maintained at 0° C., whereas in Examples 19 through 23, the reaction temperature was 30° C.

From the results of these tests, it can be seen that relatively high yields of the desired polymer having a low viscosity are obtained only when a very small quantity of the polymerization regulator is used.

*Example 8*

To a reaction vessel which has been flushed with dry nitrogen to remove atmospheric oxygen and moisture was charged 900 ml. of benzene containing 10 p.p.m. of water, 86.4 g. (0.8 mole) of 1-vinyl-cyclohexene-(3), 15 millimoles of nickel (II)-acetyl acetonate and 90 millimoles of ethyl aluminum sesquichloride at room temperature. 324 g. (6 moles) of a butadiene monomer at 20° C. and containing 98.8 molar percent of butadiene and as governing impurities 0.04 molar percent allene, 0.06 molar percent propylene, 0.01 molar percent n-butane, 0.99 molar percent 1-/iso-butene, 0.02 molar percent trans-butane, 0.02 molar percent cis-butene and <0.01 molar percent isobutane was then continuously charged into the reactor over a five hour period while continuously stirring, in the gaseous phase. Simultaneously, there was introduced dropwise 312 g. (3 moles) styrene. After continuing the stirring one hour, the catalyst is decomposed with 50 ml. of acetone and the benzene, the non-reacted styrene, and the 1-vinyl-cyclohexene-(3) are driven off with steam. The residue is then freed from water condensate. The residue is thereafter washed three times with methanol, each time with 1,000 ml., to remove the residual catalyst. The butadiene-styrene mixed polymer is finally freed from the methanol at 100° C. and 20 torrs in a thin film evaporator.

The yield is 345 g. (54% theoretical) of a thinly liquid polymer having a viscosity of 49.2 centipoises at 50° C., a density of 50/4 of 0.9468 and a refractive index $n_D^{20}$ of 1.5349.

The iodine number is 271. According to the IR analysis, the polymer contains 19% by weight of styrene and 81% butadiene. The olefinic double bonds include 75% cis-, 23% trans-, and 2% vinyl-bonds.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process of producing a liquid polydiene having a molecular weight of from 500 to 5,000 and a viscosity, measured at 50° C., of from 50 to 500 centipoises from the polymerization of a conjugated 1,3-diene monomer, by polymerizing one part by weight of the monomer in an inert diluent having dissolved therein a nickel compound and an aluminum halide compound, said compounds being present in catalytic quantities, the improvement which comprises regulating the polymerization reaction by incorporating in the diluent from 0.005 to 0.15 part by weight of a vinyl-cycloolefin.

2. The process of claim 1 wherein the vinyl-cycloolefin contains from 6 to 18 carbon atoms.

3. A process for the production of a low molecular weight liquid unsaturated polymer having a molecular weight between about 500 and about 5,000 and a viscosity, measured at 50° C., of from 50 to 500 centipoises, from a conjugated 1,3-diolefin, the process comprising: polymerizing one part by weight of the diolefin monomer in an inert diluent containing a mixed catalyst therein comprising a nickel compound, an aluminum halide of the formula $$R_nAlX_{3-n}$$

wherein R is alkyl, phenyl, or alkaryl, X is a halogen and $n$ is a number between 1 and 2, and 0.005 to 0.15 part by weight of a polymerization regulator comprising a vinyl-cycloolefin of 6 to 18 carbon atoms.

4. The process of claim 3, further characterized in that the polymerization reaction is conducted at a temperature of from 0° to 100° C. under a pressure of from 1 to 10 atmospheres absolute.

5. The process of claim 4 wherein the inert diluent is present in an amount of from 0.5 to 5 parts by weight per part of monomer.

6. The process of claim 5 wherein the aluminum catalyst is present in an amount of from 0.005 to 0.05 mole per mole of the starting monomer and the nickel catalyst is present in an amount of from 0.025 to 0.3 mole per mole of said aluminum catalyst.

7. The process of claim 6 wherein said inert diluent is a hydrocarbon of 4 to 12 carbon atoms.

8. In a process of producing a liquid polydiene having a molecular weight between about 500 and about 5,000 and a viscosity, measured at 50° C., of from 50 to 500 centipoises from the polymerization of a conjugated 1,3-diolefin, the improvement which comprises: polymerizing one part by weight of the diene monomer in 0.1 to 20 parts by weight of an inert hydrocarbon diluent having 4 to 12 carbon atoms, said diluent containing a mixed catalyst therein comprising an aluminum halide of the formula $$R_nAlX_{3-n}$$

wherein R is alkyl, phenyl, or alkaryl, X is a halogen and $n$ is a number between 1 and 2, said aluminum halide being present in an amount of from 0.0005 to 0.5 mole per mole of monomer, 0.01 to 0.5 mole of a diluent-soluble nickel compound per mole of said aluminum halide, and 0.005 to 0.15 part by weight of a polymerization regulator comprising a vinyl-cycloolefin containing from 6 to 18 carbon atoms.

9. The process of claim 8, further characterized in the polymerization reaction is conducted at a temperature of from 20° to 40° C.

10. A process for the production of a liquid unsaturated polymer having a molecular weight between about 500 and about 5,000 and a viscosity, measured at 50° C., of from 50 to 500 centipoises, from a conjugated 1,3-diolefin selected from the group consisting of butadiene, isoprene, 2,3-dimethyl-butadiene-(1,3), pentadiene-(1,3), 2-ethyl-butadiene-(1,3), 4-methyl-hexadiene-(1,3), 2-methyl-pentadiene-(1,3), 2-isopropyl-butadiene-(1,3), octatriene-(1,3,7), and mixtures thereof, the process comprising polymerizing one part by weight of the monomer in 0.1 to 20 parts by weight of an inert hydrocarbon diluent having 4 to 12 carbon atoms, the diluent containing a mixed catalyst therein comprising an aluminum halide of the formula $$R_nAlX_{3-n}$$

wherein R is alkyl, phenyl or alkaryl, X is a halogen and $n$ is a number between 1 and 2, said aluminum halide being present in an amount of from 0.0005 to 0.5 mole per mole of monomer; 0.01 to 0.5 mole of a diluent-soluble nickel compound per mole of said aluminum halide, and 0.005 to 0.15 part by weight of a polymerization regulator comprising a vinyl-cycloolefin containing from 6 to 18 carbon atoms.

11. The process of claim 10, further characterized in that the conjugated 1,3-diolefin monomer is polymerized at a temperature of from about 0° to 100° C. under a pressure of from 1 to 10 atmospheres absolute.

12. The process of claim 10, further characterized in that the conjugated diolefin monomer reactant is polymerized with an alpha-ethylenically unsaturated hydrocarbon.

13. A process as defined by claim 1 wherein the aluminum halide is an alkyl-aluminum-sesquichloride, a monoalkyl - aluminum - dihalide, a dialkll - aluminum-monohalide, an aluminum-hydride-halogenide, an aluminum-hydride-halide-etherate, and mixtures thereof.

14. A process as defined by claim 13 wherein the nickel compound is an inorganic nickel salt, a nickel salt of an organic carboxylic acid, nickel (II)-acetyl acetonate, -benzoyl acetonate, bis-(cyclopentadienyl)-nickel and bis-(cyclooctadienyl-(1,5))-nickel.

15. A process as defined by claim 14 wherein the diene monomer is selected from the group consisting of butadiene, isoprene, 2,3-dimethyl-butadiene-(1,3), pentadiene-(1,3), 2-ethyl-butadiene-(1,3), 4-methyl-hexadiene-(1,3), 2-methyl-pentadiene-1,3), 2-isopropyl-butadiene-(1,3), octatriene-(1,3,7), and mixtures thereof.

16. A process as defined by claim 15 wherein the vinyl-cyclo-olefin is 1-vinyl-4-methyl-cyclohexene-(3), 1-vinyl-cyclopentene-(3), 1-vinyl-cyclobutene-(2), limonene, 3,5-diethyl - 1 - vinyl - cyclopentene - (2), divinyl - cyclohexene, or 1-vinyl-cyclohexene-(3).

No references cited.

DELBERT E. GANTZ, *Primary Examiner.*

G. E. SCHMITKONS, *Assistant Examiner.*